United States Patent
Jayant et al.

(10) Patent No.: US 6,882,686 B2
(45) Date of Patent: Apr. 19, 2005

(54) SYSTEM AND METHOD FOR OBJECT-ORIENTED VIDEO PROCESSING

(75) Inventors: Nikil Jayant, Alpharetta, GA (US); Seong-Hwan Jang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/875,480

(22) Filed: Jun. 6, 2001

(65) Prior Publication Data

US 2002/0018523 A1 Feb. 14, 2002

Related U.S. Application Data

(60) Provisional application No. 60/209,576, filed on Jun. 6, 2000.

(51) Int. Cl.[7] ................................. H04B 1/66
(52) U.S. Cl. ........................... 375/240.08; 375/240.27; 375/240.24; 375/240.26; 375/240.23; 714/756; 714/755; 714/774; 714/776; 714/779; 370/472; 370/473; 370/477; 370/476; 382/239; 382/246
(58) Field of Search ..................... 375/240.08, 240.24, 375/240.26, 240.27, 240.23, 240.03, 240.15, 240.14, 240.12; 370/472, 473, 477, 476, 208; 382/239, 246, 236, 238; 714/756, 755, 774, 776, 779; 348/14, 17, 416, 607, 390, 717, 411–415, 402, 409, 420, 384

(56) References Cited

U.S. PATENT DOCUMENTS

| | | | |
|---|---|---|---|
| 4,356,507 A | 10/1982 | Goldberg et al. | ........... 348/717 |
| 4,437,125 A | 3/1984 | Yamamoto | ................... 348/607 |
| 4,591,909 A * | 5/1986 | Kuroda et al. | ......... 375/240.12 |
| 5,117,427 A * | 5/1992 | Miyake et al. | ............... 714/755 |
| 5,361,249 A | 11/1994 | Monastra et al. | ........... 370/217 |
| 5,400,076 A | 3/1995 | Iwamura | ..................... 348/416 |
| 5,442,400 A | 8/1995 | Sun et al. | ............. 375/240.15 |
| 5,465,267 A * | 11/1995 | Todoroki | ..................... 375/279 |
| 5,475,716 A * | 12/1995 | Huang | ......................... 375/354 |
| 5,710,590 A | 1/1998 | Ichige et al. | .................. 348/14 |
| 5,812,787 A * | 9/1998 | Astle | ..................... 375/240.25 |
| 6,078,619 A * | 6/2000 | Monro et al. | ............... 375/240 |
| 6,151,296 A * | 11/2000 | Vijayan et al. | ............. 370/208 |
| 6,415,055 B1 * | 7/2002 | Kato | ......................... 382/236 |

\* cited by examiner

Primary Examiner—Shawn S. An
(74) Attorney, Agent, or Firm—Thomas, Kayden, Horstemeyer & Risley

(57) ABSTRACT

The object-oriented coder discriminates resource allocation between objects and non-objects for video messaging applications over wireless networks. The object-oriented coder executes a rate control algorithm, an unequal error protection algorithm, and an error concealment algorithm. In the rate control algorithm, an iterative feedback rate control scheme is used in which quantization values of object and non-object data are held constant. In the unequal error protection algorithm, the bit stream is partitioned by object macroblocks and non-object macroblocks. In the error concealment algorithm, five bits of QUANT values of each GOB are used for representing location and motion vectors of the object in the next frame, since the quantization value is constant. The five bits are not used for quantization value. The five bits are used for error concealment to avoid bit rate overhead. The object-oriented coder increases encoding delay, but this increase is acceptable in messaging.

42 Claims, 2 Drawing Sheets

SYSTEM AND METHOD FOR OBJECT-ORIENTED VIDEO PROCESSING

CLAIM OF PRIORITY

This document claims priority to and the benefit of the filing date of co-pending and commonly assigned provisional application entitled "Object-Oriented Video Processing For Source Coding, Channel Coding, and Error Concealment," assigned Ser. No. 60/209,576, filed Jun. 6, 2000, which is hereby incorporated herein by reference.

TECHNICAL FIELD

The present invention relates generally to wireless communication systems, and more particularly, to a system and method for communication of video information over a wireless network.

BACKGROUND OF THE INVENTION

Recently, there has been a great demand for high quality visual services over wireless networks. However, the received video quality is still inadequate due to bandwidth constraints, high error rates and the time varying nature of the channels. In particular, delay constraints for interactive real time video applications, such as video conferencing, make it even more difficult to effectively encode and transmit the video signal. In addition, in video communications and/or storage, there are some unique conditions for both source coding and transmission. With video messaging, a one-way communication, the encoder is allowed to have much more delay, and can take advantage of this for effective coding. In transmission, a re-transmission-based error control technique such as automatic retransmission query (ARQ) can be used between messaging servers. Still, forward error control (FEC) and error concealment based provisions for error resilience are required for mobile users trying to access a messaging server over the wireless network. This is because the mobile users may not be able to store a whole video message, due to the limitation of storage capacity of portable decoder. The bit rate for video messaging should be low, conventionally in the range of 20~60 kbps, in order to avoid excessive occupancy of the wireless channel as well as storage device of messaging servers. Therefore, an effective coding and error control scheme for video communications, messaging and/or data storage is required.

Although there has been significant progress in waveform-based digital video coders such as block based Motion Compensated Discrete Cosine Transform (MC DCT) [as discussed in the ITU-T, Draft Recommendation H.263: Video Coding for low bit rate communication, incorporated herein by reference], object-based coding approaches to represent video content have concurrently emerged. However, these approaches are characterized by computationally intensive algorithms for accurately segmenting objects, and, in some cases, a heavy outlay of bits for representing arbitrary shapes of objects. A hybrid approach which blends waveform-based coding with object-oriented techniques can improve subjective quality with a useful complexity-delay tradeoff. [Such approaches are discussed, for example, in J. Hartung, et al.," Object-Oriented H.263 Compatible Video Coding Platform for Conferencing Applications.", IEEE Journal on Selected Areas in Communication, vol. 16, No.1, January 1998, incorporated herein by reference, and in D. E. Pearson, "Developments in model-based video coding", Proc. IEEE, vol. 83, June 1995, incorporated herein by reference.] This approach is particularly appropriate for meeting the needs of the wireless messaging system. However, such earlier work has tried to improve video quality by segmenting objects and using object-based rate control for H.263 video. Since finer quantization step size is used for the main object in the scene, the subjective quality of video was shown to increase noticeably. However, this work did not explicitly address error resilience. In other work [see for example P. Batra and S. F. Chang, "Effective Algorithms for Video Transmission over Wireless Channel", Intern. Journal of Image Communication: Signal Processing, Special Issue on Moble Image/Video Transmission, 1998, incorporated herein by reference], a content based approach is used for unequal resource allocation for error protection. However, the meaning of "content" in that work was not the object in a video scene, but the syntax of video bit stream such as header, motion vectors and discrete cosine transform (DCT) coefficients. Therefore, a need exists in the industry to communicate and/or store video data with a higher degree of reliability and accuracy.

SUMMARY OF THE INVENTION

The present invention, an object-oriented coder, provides a system and method that discriminates resource allocation between objects and non-objects. The approach can also provide adaptivity to the semantic content of video.

Briefly described, in architecture, the system and method can be implemented as follows. One embodiment of the object-oriented coder executes a rate control algorithm, an unequal error protection algorithm, and an error concealment algorithm. The object-oriented coder is designed for video communication applications over communication networks and/or video data storage. In the rate control algorithm, an iterative feedback rate control scheme is used in which quantization values of object and non-object data are held constant for an entire video sequence for better picture quality and effective error resilience. In the unequal error protection algorithm, the bit stream is partitioned by object macroblocks and non-object macroblocks. In the error concealment algorithm, five bits of QUANT values of each group of blocks (GOB) are used for representing location and motion vectors of the object in the next frame, since the quantization value is constant. Those five bits are not used for quantization value. The five bits are used for error concealment to avoid bit rate overhead. The object-oriented coder does increase encoding delay, but this increase is acceptable in messaging.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The object-oriented coder, as defined in the claims, can be better understood with reference to the following drawings. The components within the drawings are not necessarily to scale relative to each other, emphasis instead being placed on clearly illustrating the principles of the object-oriented coder.

Figure 1:
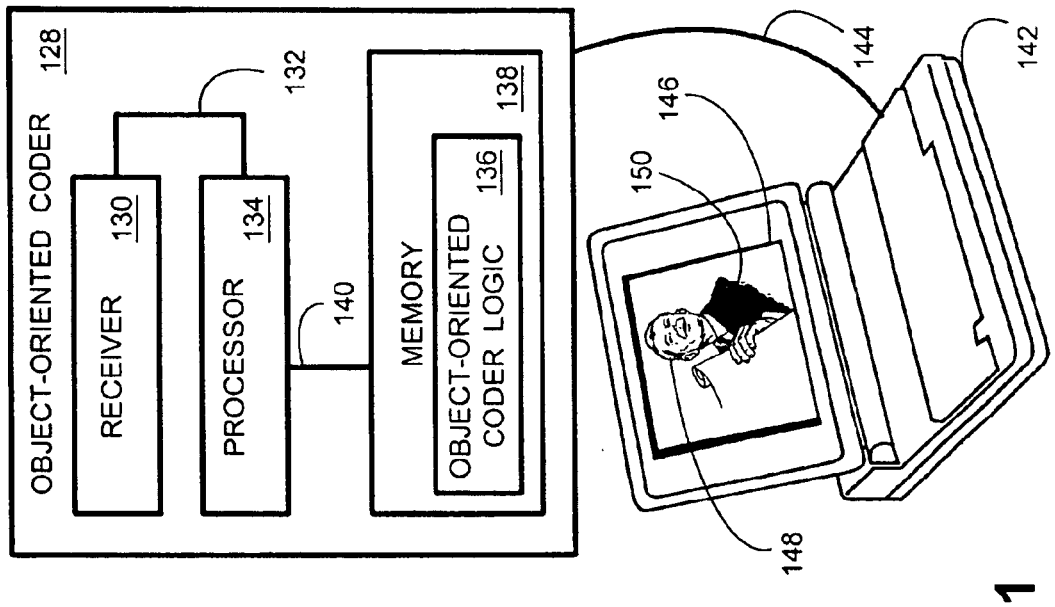
FIG. 1 shows a system overview of a wireless video communication network in which the object-oriented coder is implemented.
Figure 1:
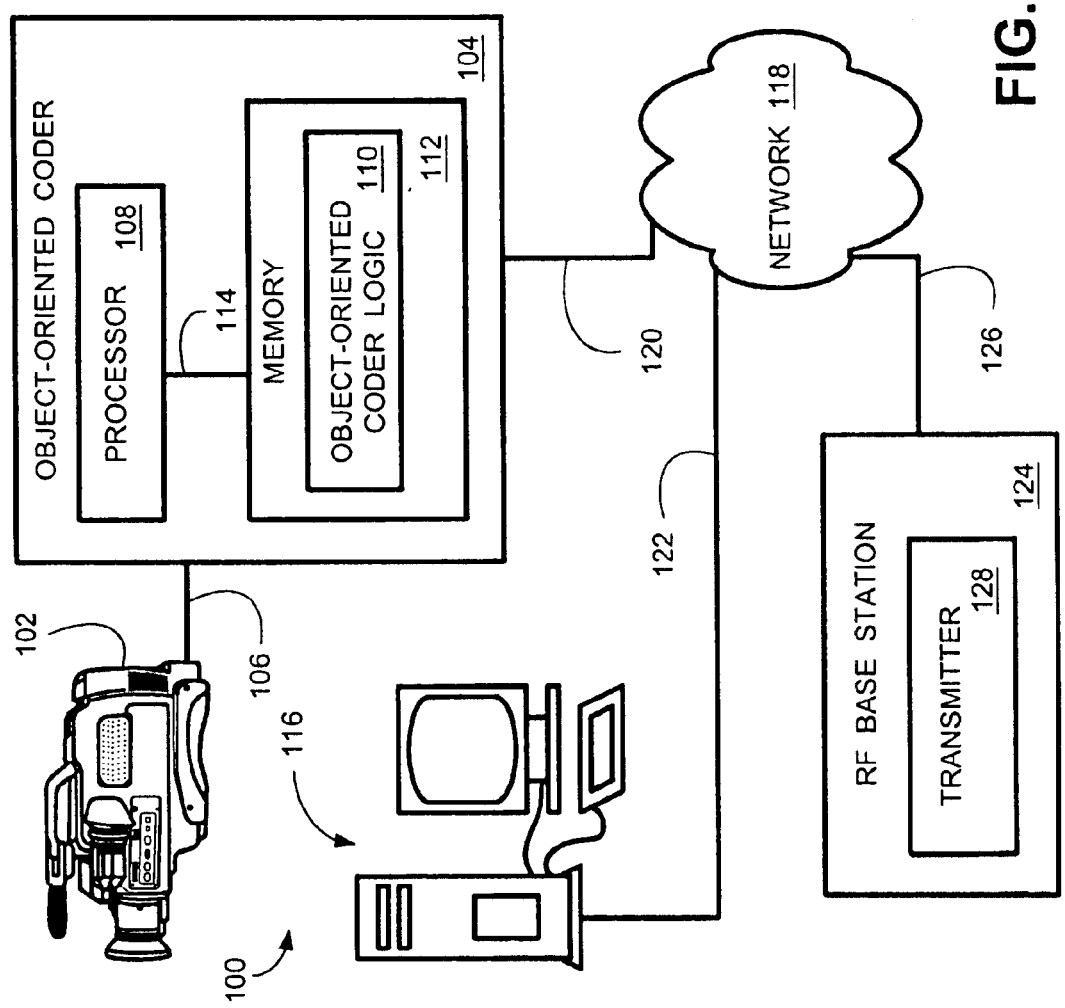

For convenience of illustration, elements among the several figures that are similar to each other may bear the same reference numerals. Such elements bearing the same reference numerals may be considered to be like elements. However, one skilled in the art will realize that like numeraled elements among the several figures need not be identical, as any variations of such elements will not adversely affect the functioning and performance of the present invention. Furthermore, like elements that are like-numbered may be described in detail only in the first instance of occurrence, and not described in detail again when occurring in subsequent figures.

DETAILED DESCRIPTION OF THE INVENTION

A. Overview of the Object-Oriented Coder System and Method

The object-oriented coder discriminates resource allocation between objects and non-objects, since human attention is usually focused on one dominant object. The object-oriented coder also provides adaptivity to the semantic content of video, and improves error resilience as well as picture quality, as described in the inventors' paper entitled "Object-Oriented Source and Channel Coding of Video Messaging Applications over Wireless Networks", IEEE paper, and presented at the IEEE Globecom 2000 seminar on Nov. 28, 2000, incorporated herein by reference.

FIG. 1 shows an illustrative system overview of a communication system 100 in which the object-oriented coder is implemented. A video camera 102 records a video and provides the video data to a first object-oriented coder 104, via connection 106. Connection 106 is any suitable connection. Alternatively, video camera 102 may provide the video data to encoder 104 using other suitable data transfer media, such as, but not limited to, memory mediums, infra red communications, radio frequency (RF) communications, or other well known video data transfer mediums.

The object-oriented coder encodes the video data. Processor 108 retrieves the object-oriented coder logic 110 residing in memory 112, via connection 114. The object-oriented coder logic 110 is executed to partition and prepare the data in a manner described below. After the video data has been encoded by the object-oriented coder logic 110, the video data is transferred to the messaging server 116 through network 118.

Network 118 is any suitable communications network, such as, but not limited to, the Internet, a conventional telephony system, a packetized communication system, or the like, including combination systems. The object-oriented encoder 104 and the messaging server 116 are coupled to the network 118 via connections 120 and 122, respectively. The messaging server 116 is a conventional device and/or system well known in the art of providing a data retrieval service such that a subscriber may retrieve stored data at desired times. One non-limiting example of such a messaging system 116 is a conventional e-mail system.

The present invention enables the subscriber (not shown) to retrieve the stored video data from the messaging server 116 with a high degree of accuracy and reliability. When the subscriber requests the messaging server 116 to provide the video data, the video data is transferred to a suitable location, such as RF base station 124 (via connection 122, the network 118 and connection 126) for broadcasting as an RF signal by transmitter 128.

A second object-oriented coder 128 receives the broadcasted RF signal having the video data with receiver 130. The receiver 130 provides the received video data to processor 134, via connection 132. Processor 134 retrieves the object-oriented coder logic 136 residing in memory 138, via connection 140. The object-oriented coder logic 136 is executed to further process the received video data. After final processing, the video data is provided to the subscriber's viewing device, such as laptop computer 142, via connection 144. Connection 144 is any suitable connection. Alternatively, the second object-oriented coder 128 may provide the video data to laptop 142 using other suitable data transfer media, such as, but not limited to, memory storage mediums, infra red communications, radio frequency (RF) communications or other well known video data transfer mediums.

For convenience of illustrating the operations and functionality of the object-oriented coders 104 and/or 128, the object-oriented coders 104 and/or 128 are shown as stand-alone devices. In alternative embodiments, the object-oriented coder 104 may reside within the video camera 102 or within the messaging server 116. Furthermore, the video camera 102, object-oriented coder 104 and/or the message server 116 may be directly coupled together without the use of the network 118. Similarly the object-oriented coder 128 may be implemented within the laptop 142 (or another suitable viewing device). Additionally, the receiver 130 may reside outside of the object-oriented coder 128 and be in communication with the object-oriented coder 128 using any suitable communication medium.

The subscriber then views the processed video data on viewing screen 146. For illustration purposes, the subscriber is viewing a figure of a dominant object 148 (the person's head) and a background 150 (shoulders, hand and paper). The object-oriented coder takes advantage of the fact that the human perceptual system concentrates attention on the dominant object 148 in a scene. Therefore, the object-oriented coders 104 and/or 128 maintain good quality of the dominant object 148 by sacrificing quality of the background 150, as described hereinbelow. The object-oriented coders 104 and/or 128 are especially effective at very low bit data transmit rates ranging from 20~60 kbps.

B. Partitioning the Video Images

The object-oriented coder 104 (FIG. 1) receives the video data from the video camera 102 and partitions the video data for each frame into a dominant object 148 and a background 150 by executing the object-oriented coder logic 110. The object-oriented coder logic 110 identifies each object macroblock associated with the dominant object 148 and each background macroblock associated with the background 150. Processing of the macroblocks can then be based upon whether the macroblock is associated with the dominant object 148 or associated with the background 150.

For example, consider an image where the human face is the dominant object 148, and the rest of the head-and-shoulder scene is background 150. The object-oriented coders 104 and/or 128 employ partitioning (segmentation) based on motion vectors, resulting in an elliptical head-shape model and edge detection of the dominant object 148. Since the object-oriented coders 104 and/or 128 use macroblock-based segmentation, there is no need to perform an accurate segmentation of all object shapes.

C. Object-Oriented Rate Control

The object-oriented rate control algorithm modifies the rate at which the object macroblocks are to be transmitted.

Because the object macroblocks associated with the dominant image 148 are more important than the background macroblocks associated with the background 150, a greater portion of the available data transmission rate is allocated to transmitting the object macroblocks associated with the dominant image 148. Less of the available data transmission rate is allocated to the background macroblocks associated with the background 150. Thus, the rate control algorithm residing in the object-oriented coder logic 110 reallocates data transmission rates. In one embodiment, the data rates for the object macroblocks associated with the dominant image 148 are specified by the user. In another embodiment, the data rates for the object macroblocks associated with the dominant image 148 are determined automatically. For example, the data rate for the object macroblocks associated with the dominant image 148 is based upon a percentage of the total macroblocks. Other suitable allocation techniques may be equally employed without departing from the operation and functionality of the present invention, and are intended to be included within the scope of this specification and to be protected by the accompanying claims.

In one embodiment, the coding platform used by the object-oriented coders 104 and/or 128 is an ITU-T H.263 for low bit rate application. In H.263 video, five bits of absolute quantization value are sent by the picture header and the group of blocks (GOB) header to be used for resynchronization. When a quantization value is different between successive macroblocks, two bits of difference QUANT (DQUANT) are sent at each macroblock. In the object-oriented coder algorithm, the same quantization value is used for each object and background, over the entire video sequence. Therefore, the object-oriented coders 104 and/or 128 do not need five bits of QUANT at the GOB header. In order to decide the quantization value at a given bit rate, the object-oriented coders 104 and/or 128 use an "iterative feedback" rate control, in which the object-oriented coders 104 and/or 128 set the quantization value of the object, and iteratively increase the quantization value of background until the total target bit rate is met. If the bit rate constraints can not be met with the maximum quantization value of the background, the object-oriented coders 104 and/or 128 iteratively increase the quantization value of the object. The object-oriented coders 104 and/or 128 use a simplified quantization table. Four bits QUANT of picture header are used for representing the quantization value of the entire background. The remaining one bit of QUANT of picture header and two bits of DQUANT are used for representing the quantization value for all of the objects. DQUANT is also used as a marker for beginning the object macroblock at the corresponding GOB.

D. Unequal Error Protection Control

Figure 2:
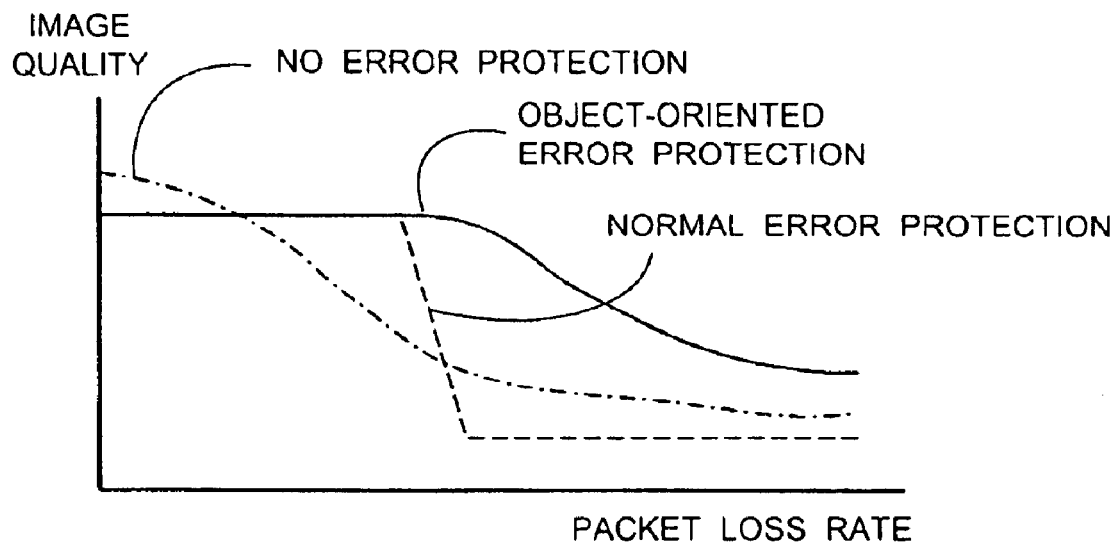
FIG. 2 shows an impressionistic view of video quality versus the packet loss rate.

In one embodiment, interleaving and Reed Solomon (RS) channel coding are used for the error protection algorithm residing within the object-oriented coder logic 110. Interleaving is an effective error control scheme, since interleaving spreads the burst error caused by packet loss. However, if the packet loss rate exceeds the error correcting capacity of the RS coding, the quality of decoded video degrades abruptly even below the quality level of video without any error protection because the entire interleaving frame is lost. FIG. 2 shows an impressionistic view of video quality versus the packet loss rate, thereby demonstrating the need for a more robust error protection algorithm, especially at the higher packet loss rates.

The object-oriented coders 104 and/or 128 employ an object-oriented unequal error protection scheme in which the bit stream is partitioned by object macroblocks (associated with the dominant image 148, FIG. 1) and background macroblocks (associated with the background 150, FIG. 1). A conventional decoder provides acceptable quality of video only with object macroblocks. Therefore, because the object-oriented coders 104 and/or 128 reduce the error protection overhead for background macroblocks, and an overall improvement of video quality is realized at the same bit rate.

In one embodiment, parameters N, K and p represent interleaving frame size, payload size and packet size, respectively. The maximum error correcting capability of the RS code in the packet structure is (N−K)/2. Thus, if the packet loss rate is e, the minimum overhead ratio v can be obtained from equations (1) and (2).

$$\frac{(N-K)}{2} = N \times e. \tag{1}$$

$$v = \frac{2e}{(1-2e)}, \text{ where } (0 \le e < 0.5) \tag{2}$$

The object-oriented coder 104 partitions the bit stream into object macroblocks and background macroblocks, and header bits exist for both bit streams. Let H, obj, and bg represent the total bits of header, object macroblocks, and background macroblocks, respectively. The total bit rate of video without partitioning (BW1) can be written in equation (3) as follows;

$$BW1=(H+obj+bg)\times(v+1). \tag{3}$$

The total bit rate of video with partitioning (BW2), as shown in equation (4), is $$BW2=(H+obj)(v+1)+(H+bg)(w\times v+1), \text{ where } (0<w<1) \tag{4}$$

The parameter w is the weighting factor for unequal error protection between object and background. The quantity bg can be represented as a function of bit rate R. The condition in which BW2 is less than BW1 can be written as $$bg(R)\times v \geq H+(H+bg(R))\times w\times v \tag{5}$$

Figure 3:
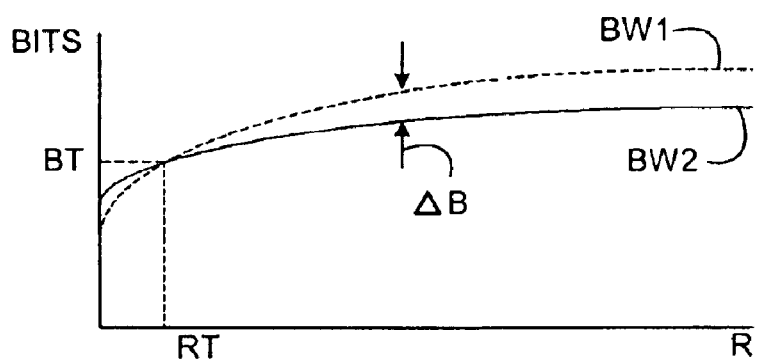
FIG. 3 is the sketch of BW1 and BW2 as a function of bit rate R.

FIG. 3 is a sketch of BW1 and BW2 as a function of bit rate R. At a bit rate higher than the point RT where the two curves cross, the amount of overhead with data partitioning is less than that of overhead without data partitioning. Therefore, at the bit rate higher than RT, the object-oriented coder assigns more error control overhead to the object macroblocks by the value ΔB. When the number of lost packets is higher than the error correcting capability, the decoded video quality is severely degraded, because the locations of error bits are spread to a large area of the bit stream by the de-interleaving procedure. The data partitioning scheme employed by the object-oriented coders 104 and/or 128 increases the error resilience of object macroblocks by the increased error protection ΔB, and alleviates the degradation of video quality at the higher packet loss. The parameter BT and ΔB of FIG. 3 can be written according to equations (6) and (7) as follows, $$BT = \left\{obj(R) + \frac{H}{2e(1-w)}\right\} \times (v+1) \tag{6}$$

$$\Delta B = bg(R)\times v\times(1-w)-H(1+w\times v) \tag{7}$$

E. Error Concealment Control

Error concealment minimizes the impact of packet loss on the corresponding image, and minimizes the propagation of errors to the following frames. If the object-oriented coder 128 knows motion vector information of a lost macroblock, more effective error concealment can be achieved by motion compensation. In ISO/IEC MPEG-2, Intra MV mode is used to transmit the motion vectors of the beneath macroblocks for error concealment. However, the amount of overhead for the Intra MV mode is very expensive. Furthermore, it can not handle more than two successive lost slices.

An object-oriented coder 128 employing a concealment algorithm residing in the object-oriented coder logic 136 uses the unused five bits of QUANT information in the GOB header and one frame of coding delay, and does not need to send the five bit QUANT information of the GOB header. That is, object-oriented coder 128 uses four bits to represent the location and motion vectors of the object macroblock of the next frame instead of the quantization value. Thus, the location of the object macroblock can be expressed by four bits since one GOB consists of eleven macroblocks in QCIF format, incorporated herein by reference (176×144 pels). If the GOB has no object, the average motion vector of the object is sent by four bits of QUANT of GOB header. The average motion vector in the x-direction is sent by the first GOB without the object, and the y-direction is sent by the next GOB without the object. The remaining one bit is used as the marker bit. If the marker bit is '1', the remaining four bits represent the location of the object macroblock. If the marker bit is '0', the remaining four bits represent the motion vector. The value 31 represents no information. When the decoder employing an embodiment of the object-oriented coder loses synchronization by packet loss, the decoder discards data until it finds the next set of header bits. At that time, the object-oriented coder 128 performs motion compensated concealment for the object macroblock. For the remaining background macroblocks, the same macroblocks of the previous frame are repeated. The object-oriented coder 128 then predicts the length of object macroblock from the previous frames. In one embodiment, if two frames of GOB headers are lost, the object-oriented coder 128 uses the corresponding information from two frames of history.

F. Alternative Embodiment

The previously described preferred embodiment of the object-oriented coder system and method employs a rate control algorithm, an unequal error protection algorithm, and an error concealment algorithm. Alternative embodiments of an object-oriented coder employ one or more of the above described algorithms, since each algorithm alone or in combination with the other algorithms improves the quality of the transmitted video data.

It should be emphasized that the above-described "embodiments" of the object-oriented coder, particularly, any "preferred" embodiments, are merely possible examples of implementations, merely set forth for a clear understanding of the principles of the object-oriented coder. Many variations and modifications may be made to the above-described embodiment(s) of the object-oriented coder without departing substantially from the spirit and principles of the object-oriented coder. All such modifications and variations are intended to be included herein within the scope of the object-oriented coder, and be protected by the claims that follow.

Therefore, the following is claimed:

1. A system for communication of video information over a network, comprising:
   a first object-oriented coder that divides data into object macroblocks and background macroblocks, the object macroblocks and background macroblocks being a portion of partitioned-video data that is transmitted at a bit-rate, and that assigns a higher number of error control overhead bits to the object macroblocks than to the background macroblocks based on a threshold of the bit rate of the partitioned-video data, wherein the first object-oriented coder further configured to evaluate whether the bit-rate of the partitioned-video data is less than a bit rate of nonpartitioned-video data and assigns a higher number of error control overhead bits to the object macroblocks than to the background macroblocks when the bit rate of the partitioned-video data is less than the bit rate of the nonpartitioned-video data.

2. The system of claim 1, wherein the first object-oriented coder comprises a first processor and a first memory.

3. The system of claim 1, further comprising a second object-oriented coder that allocates a higher data transmission rate to the object macroblocks than to the background macroblocks.

4. The system of claim 1, further comprising a third object-oriented coder that receives a location vector and at least one motion vector of the object macroblock in a previous frame, the location vector and the at least one motion vector corresponds to location of the object macroblock that is missing in a current frame, and replaces the object macroblock that is missing in the current frame with the object macroblock in the previous frame.

5. The system of claim 4, wherein the third object-oriented coder further comprises assigning a quantization factor a value that provides for receiving more location vectors and motion vectors of the object macroblock.

6. The system of claim 1, wherein the first object-oriented coder assigns a higher number of error control overhead bits to the object macroblocks than to the background macroblocks based on a level of distortion in the coded image data measured either objectively or subjectively.

7. The system of claim 6, wherein the level of distortion in the coded image data measured objectively includes the determination of a threshold in the signal to noise ratio of the object macroblocks and background macroblocks.

8. The system of claim 6, wherein the level of distortion in the coded image data measured subjectively includes the determination of an image quality by a user.

9. A method for communicating video information over a network, comprising the steps of:
   dividing data into object macroblocks and background macroblocks, the object macroblocks and background macroblocks being a portion of partitioned-video data that is transmitted at a bit-rate;
   assigning a higher number of error control overhead bits to the object macroblocks than to background macroblocks based on a threshold of the bit rate of the partitioned-video data;
   evaluating whether the bit-rate of the partitioned-video data is less then a bit rate of nonpartitioned-video data; and
   assigning a higher number of error control overhead bits to the object macroblocks than to the background macroblocks when the bit rate of the partitioned-video data is less than the bit rate of the nonpartitioned-video data.

10. The method of claim 9, further comprising allocating a higher data transmission rate to the object macroblocks than to the background macroblocks.

11. The method of claim 9, further comprising receiving a location vector and at least one motion vector of the object macroblock in a previous frame, the location vector and the at least one motion vector corresponding to location of the object macroblock that is missing in a current frame; and replacing the object macroblock that is missing in the current frame with the object macroblock in the previous frame.

12. The method of claim 11, wherein receiving the location vector and the at least one motion vector of the object macroblock in the previous frame further comprises assigning a quantization factor a value that provides for receiving more location vectors and motion vectors of the object macroblock.

13. A system for communicating video information over a network, comprising:
   means for dividing data into object macroblocks and background macroblocks, the object macroblocks and background macroblocks being a portion of partitioned-video data that is transmitted at a bit-rate;
   means for allocating a higher number of error control overhead bits to the object macroblocks than to the background macroblocks based on a threshold of the bit rate of the partitioned-video data;
   means for evaluating whether the bit-rate of the partitioned-video data is less than a bit rate of nonpartitioned-video data; and
   means for assigning a higher number of error control overhead bits to the object macroblocks than to the background macroblocks when the bit rate of the partitioned-video data is less than the bit rate of the nonpartitioned-video data.

14. The system of claim 13 further comprising means for allocating a higher data transmission rate to the object macroblocks than to the background macroblocks.

15. The system of claim 14, wherein one of the means for allocating one of a higher number of error control overhead bits and the means for allocating a higher data transmission rate is a first processor.

16. The system of claim 13, further comprising:
   means for receiving a location vector and at least one motion vector of the object macroblock in a previous frame, the location vector and the at least one motion vector corresponding to location of an object macroblock that is missing in a current frame; and
   means for replacing the object macroblock that is missing in the current frame with the object macroblock in the previous frame.

17. The system of claim 16, wherein the means for receiving the location vector and the at least one motion vector of the object macroblock further comprises assigning a quantization factor a value that provides for receiving more location vectors and motion vectors of the object macroblock.

18. The system of claim 16, wherein the means for receiving and for replacing is a second processor.

19. A computer readable medium having a computer program for communicating video information over a network, the program performing the steps of:
   dividing data into object macroblocks and background macroblocks, the object macroblocks and background macroblocks being a portion of partitioned-video data that is transmitted at a bit-rate;
   assigning a higher number of error control overhead bits to the object macroblocks than to the background macroblocks based on a threshold of the bit rate of the partitioned-video data;
   evaluating whether the bit-rate of the partitioned-video data is less than a bit rate of nonpartitioned-video data; and
   assigning a higher number of error control overhead bits to the object macroblocks than to the background macroblocks when the bit rate of the partitioned-video data is less than the bit rate of the nonpartitioned-video data.

20. The computer program of claim 19, further comprising allocating a higher data transmission rate to the object macroblocks than to the background macroblocks.

21. The computer program of claim 19, further comprising receiving a location vector and at least one motion vector of the object macroblock in a previous frame, the location vector and the at least one motion vector corresponding to location of object macroblock that is missing in a current frame; and replacing the object macroblock that is missing in the current frame with the object macroblock in the previous frame.

22. The computer program of claim 21, wherein receiving the location vector and the at least one motion vector of the object macroblock in the previous frame further comprises assigning a quantization factor a value that provides for receiving more location vectors and motion vectors of the object macroblock.

23. A system for communication of video information over a network, comprising:
   a first object-oriented coder that divides data into object macroblocks and background macroblocks, receives a location vector and at least one motion vector of the object macroblock in a previous frame, the location vector and the at least one motion vector corresponds to location of the object macroblock that is missing in a current frame, and replaces the object macroblock that is missing in the current frame with the object macroblock in the previous frame;
   wherein the first object-oriented coder assigns a quantization factor a value that provides for receiving more location vectors and motion vectors of an object macroblock.

24. The system of claim 23, wherein the first object-oriented coder uses at least one bit that was designated for the quantization value of the object and background macroblocks to represent the location and motion vectors of the object macroblock instead of the quantization value.

25. The system of claim 23, wherein the first object-oriented coder comprises a first processor and a first memory.

26. The system of claim 23, further comprising a second object-oriented coder that allocates a higher data transmission rate to the object macroblocks than to the background macroblocks.

27. The system of claim 23, further comprising a third object-oriented coder that assigns a higher number of error control overhead bits to the object macroblocks than to the background macroblocks.

28. A method for communicating video information over a network, the method comprising the steps of:
   dividing data into object macroblocks and background macroblocks;
   receiving a location vector and at least one motion vector of the object macroblock in a previous frame, the location vector and the at least one motion vector corresponding to location of the object macroblock that is missing in a current frame;
   replacing the object macroblock that is missing in the current frame with the object macroblock in the previous frame; and
   assigning a quantization factor a value that provides for receiving more location vectors and motion vectors of the object macroblock.

29. The method of claim 28, wherein assigning the quantization factor further comprising using at least one bit that was designated for the quantization value of the object and background macroblocks to represent the location and motion vectors of the object macroblock instead of the quantization value.

30. The method of claim 28, further comprising allocating a higher data transmission rate to the object macroblocks than to the background macroblocks.

31. The method of claim 28, further comprising assigning a higher number of error control overhead bits to the object macroblocks than to the background macroblocks.

32. A system for communicating video information over a network, comprising:
   means for dividing data into object macroblocks and background macroblocks;
   means for receiving a location vector and at least one motion vector of the object macroblock in a previous frame, the location vector and the at least one motion vector corresponding to location of the object macroblock that is missing in a current frame;
   means for replacing the object macroblock that is missing in the current frame with the object macroblock in the previous frame; and
   means for assigning a quantization factor a value that provides for receiving more location vectors and motion vectors of the object macroblock.

33. The system of claim 32, wherein means for assigning the quantization factor further comprises using at least one bit that was designated for the quantization value of the object and background macroblocks to represent the location and motion vectors of the object macroblock instead of the quantization value.

34. The system of claim 32, further comprising the means for receiving and for replacing is a first processor.

35. The system of claim 32, further comprising means for allocating a higher data transmission rate to the object macroblocks than to the background macroblocks.

36. The system of claim 35, wherein the means for allocating a higher data transmission rate is a second processor.

37. The system of claim 32 further comprising means for allocating a higher number of error control overhead bits to the object macroblocks than to the background macroblocks.

38. The system of claim 37, wherein the means for allocating a higher number of error control overhead bits is a third processor.

39. A computer readable medium having a computer program for communicating video information over a network, the program performing the steps of:
   dividing data into object macroblocks and background macroblocks;
   receiving a location vector and at least one motion vector of the object macroblock in a previous frame, the location vector and the at least one motion vector corresponding to location of the object macroblock that is missing in a current frame;
   replacing the object macroblock that is missing in the current frame with e object macroblock in the previous frame; and
   assigning a quantization factor a value that provides for receiving more location vectors and motion vectors of the object macroblock.

40. The computer program of claim 39, wherein assigning the quantization factor further comprises using at least one bit that was designated for the quantization value of the object and background macroblocks to represent the location and motion vectors of the object macroblock instead of the quantization value.

41. The computer program of claim 39, further comprising assigning a higher number of error control overhead bits to the object macroblocks than to the background macroblocks.

42. The computer program of claim 39, further comprising allocating a higher data transmission rate to the object macroblocks than to the background macroblocks.

* * * * *

UNITED STATES PATENT AND TRADEMARK OFFICE
CERTIFICATE OF CORRECTION

PATENT NO. : 6,882,686 B2
DATED : April 19, 2005
INVENTOR(S) : Jayant et al.

It is certified that error appears in the above-identified patent and that said Letters Patent is hereby corrected as shown below:

Column 8,
Line 7, after the word "coder" please insert -- is --.
Line 10, delete the word "assigns" and add -- to assign --.

Column 10,
Line 22, delete the words "communication of" and add -- communicating --.

Signed and Sealed this

Sixteenth Day of August, 2005

JON W. DUDAS
*Director of the United States Patent and Trademark Office*